United States Patent
Kato

[19]

[11] Patent Number: 6,134,194
[45] Date of Patent: Oct. 17, 2000

[54] OPTICAL REPRODUCTION APPARATUS CAPABLE OF REPRODUCING INFORMATION DATA IN A PREDETERMINED ORDER

[75] Inventor: Tetsuya Kato, Sayama, Japan

[73] Assignee: TEAC Corporation, Tokyo, Japan

[21] Appl. No.: 09/098,582

[22] Filed: Jun. 17, 1998

[30] Foreign Application Priority Data

Jun. 18, 1997 [JP] Japan .................................. 9-161010

[51] Int. Cl.[7] ...................................................... G11B 7/22
[52] U.S. Cl. ............................................... 369/33; 369/32
[58] Field of Search .................................. 369/32, 33, 47, 369/48, 54, 275.3, 58

[56] References Cited

U.S. PATENT DOCUMENTS

| | | | |
|---|---|---|---|
| 5,216,644 | 6/1993 | Shiba et al. ................................ | 369/32 |
| 5,408,449 | 4/1995 | Oh ............................................. | 369/32 |
| 5,430,697 | 7/1995 | Bu ............................................. | 369/32 |
| 5,457,669 | 10/1995 | Kim et al. .................................. | 369/32 |

FOREIGN PATENT DOCUMENTS

| | | |
|---|---|---|
| 57-069545 | 4/1982 | Japan . |
| 61-253607 | 11/1986 | Japan . |
| 62-154283 | 9/1987 | Japan . |
| 62-246194 | 10/1987 | Japan . |
| 1-128248 | 5/1989 | Japan . |
| 8-195021 | 7/1996 | Japan . |

*Primary Examiner*—Tan Dinh
*Attorney, Agent, or Firm*—Anderson, Kill & Olick P.C.

[57] ABSTRACT

A reproducing apparatus is provided which can reproduce information in a predetermined order with a simple operation. The apparatus has a reader for reading out information from a recording medium on which a plurality pieces of information are recorded. An actuator changes a relative position of the reader and the recording medium. A signal generator generates a signal corresponding to a predetermined operation. When the reader is reading out information, an access operation controller switches the operation mode of the apparatus from a play mode to a stop mode. The access operation controller then controls the actuator to change the relative position of the reader and the recording medium so that the subsequent information is set ready to be read out.

8 Claims, 3 Drawing Sheets

OPTICAL REPRODUCTION APPARATUS CAPABLE OF REPRODUCING INFORMATION DATA IN A PREDETERMINED ORDER

BACKGROUND OF THE INVENTION

1. Field of the Invention

The present invention relates to a reproducing apparatus, and more particularly to a reproducing apparatus for reproducing a plurality of pieces of information recorded on a recording medium in a predetermined order.

2. Description of the Related Art

In a theater, for example, a sound effect reproducing apparatus is used for reproducing sound effects (such as the sounds of rain or wind, cries of birds, cats or dogs, or horns of automobiles) from a speaker in synchronization with words of actors or scenes of the stage. In such a sound effect reproducing apparatus, various kinds of sound effects are recorded beforehand on a magnetic tape or a read and write type disk at predetermined intervals. An operator of the apparatus determines the timing when the subsequent sound effect is to be reproduced, while watching advancement of the play on the stage. That is, the sound effect reproducing apparatus reads out the subsequent sound effect from the recording medium and reproduces it when an operation signal is input by the operator indicating the timing for reproduction.

Additionally, in a lecture meeting, for example, a lecturer may give a lecture using images. In this case, various kinds of images are recorded beforehand on a recording medium of an image reproducing apparatus for displaying the images on a screen. When the lecturer operates a remote controller, the image reproducing apparatus displays a desired image by sequentially reproducing the images recorded on the recording medium.

However, in the above-mentioned conventional reproducing apparatuses, in order to reproduce the sound effects or images at a suitable timing, it is necessary to edit the magnetic tape so that a plurality of sound effects or images are recorded thereon in a desired order of reproduction, or to program the order in which the sound effects or images recorded on the disk are reproduced. Additionally, in the conventional reproducing apparatuses, an operation is required for setting the subsequent sound effect or image ready to be accessed for reproduction. Hereinafter, the operation for setting the subsequent sound effect or image ready to be accessed for reproduction is referred to as an access operation.

To perform the access operation, the reproducing apparatus is set in a stop mode at a time when the reproduction of the current sound or image is completed. Then, the recording part of the recording medium where the sound or image to be subsequently reproduced is set ready to be accessed for reproduction. When a magnetic tape is used as the recording medium, the magnetic tape is quickly advanced to search for the subsequently recorded part. When a disk is used as the recording medium, a head for reading information is moved in a tracking direction with the disk being rotated, so that the head is positioned opposite a track which has been programmed to be subsequently reproduced.

When the access operation has been performed in the above-mentioned manner, the operator performs an operation for setting the apparatus in a temporary stop mode or a pause mode. Then, the operator waits for the timing at which the subsequent sound effect or image is to be reproduced.

In this way, operations are relatively complex and troublesome in the conventional reproducing apparatuses. For this reason, an inexperienced operator tends to perform an erroneous operation. For example, the operator may forget to switch the operation mode of the apparatus to the pause mode when the access operation is completed. In this case, the sound effect or image is reproduced immediately after the access operation is finished.

SUMMARY OF THE INVENTION

It is an object of the present invention to provide a reproducing apparatus which can obviate the above-mentioned problems.

The above-mentioned object of the present invention can be achieved by a reproducing apparatus comprising:

- a reader for reading out information from a recording medium on which a plurality of pieces of information are recorded;
- an actuator for changing a relative position of the reader and the recording medium;
- a signal generator for generating a signal corresponding to a predetermined operation; and
- an access operation controller for, when the reader is reading out information, switching the operation mode of the apparatus from a play mode to a stop mode in response to the signal generated by the signal generator and thereafter controlling the actuator to change the relative position of the reader and the recording medium so that the subsequent information is set ready to be read out.

In the present invention, the relative position of the reader and the recording medium is controlled so that the subsequent information is set ready to be accessed after the operation mode is switched from the play mode to the stop mode in response to the signal generated by the signal generator. Therefore, a standby mode, in which the information which should be subsequently reproduced is set ready to be read out, can be achieved by a single operation and, as a result, troublesome operations are avoided. Thus, according to the present invention, it is possible to improve the simplicity of operation so as to prevent erroneous operations. Additionally, according to the present invention, an inexperienced operator can reproduce the information which is set ready to be read out, without missing an adequate timing for reproduction.

The above-mentioned object can also be achieved by a reproducing apparatus comprising:

- a reader for reading out information from a recording medium on which a plurality pieces of information are recorded;
- an actuator for changing a relative position of the reader and the recording medium;
- a signal generator for generating signals corresponding to predetermined operations;
- an access operation controller for controlling the actuator to change the relative position of the reader and the recording medium so that the subsequent information is set ready to be read out after switching the operation mode of the apparatus from a play mode to a stop mode in response to a signal generated by the signal generator; and
- a reproduction controller for switching the operation mode of the apparatus from a stop mode to a play mode in response to another signal generated by the signal generator.

In the present invention, the standby mode, in which the information which should be subsequently reproduced is set ready to be read out, is achieved in response to the signal generated by the signal generator. Additionally, the operation mode of the apparatus is switched from the standby mode to the play mode in response to the another signal generated by the signal generator. Thus, the standby mode and the play mode can be achieved by a single operation, respectively, and thus troublesome operations can be avoided. Therefore, according to the present invention, it is possible to improve the simplicity of operation so that erroneous operations are prevented. Additionally, according to the present invention, an inexperienced operator can reproduce the information, which is set ready to be read out, without missing an adequate timing for reproduction.

The signal generator may generate the signal or the signals in response to the operation of a fader. Hence, the operation mode of the apparatus can be switched to the standby mode and the play mode during operation of the fader. Accordingly, it is not necessary to provide an additional operation part for performing the access operation and thus the operation can be further simplified.

Other objects and further features of the present invention will be apparent from the following detailed description when read in conjunction with the accompanying drawings.

DESCRIPTION OF THE PREFERRED EMBODIMENTS

Figure 1:
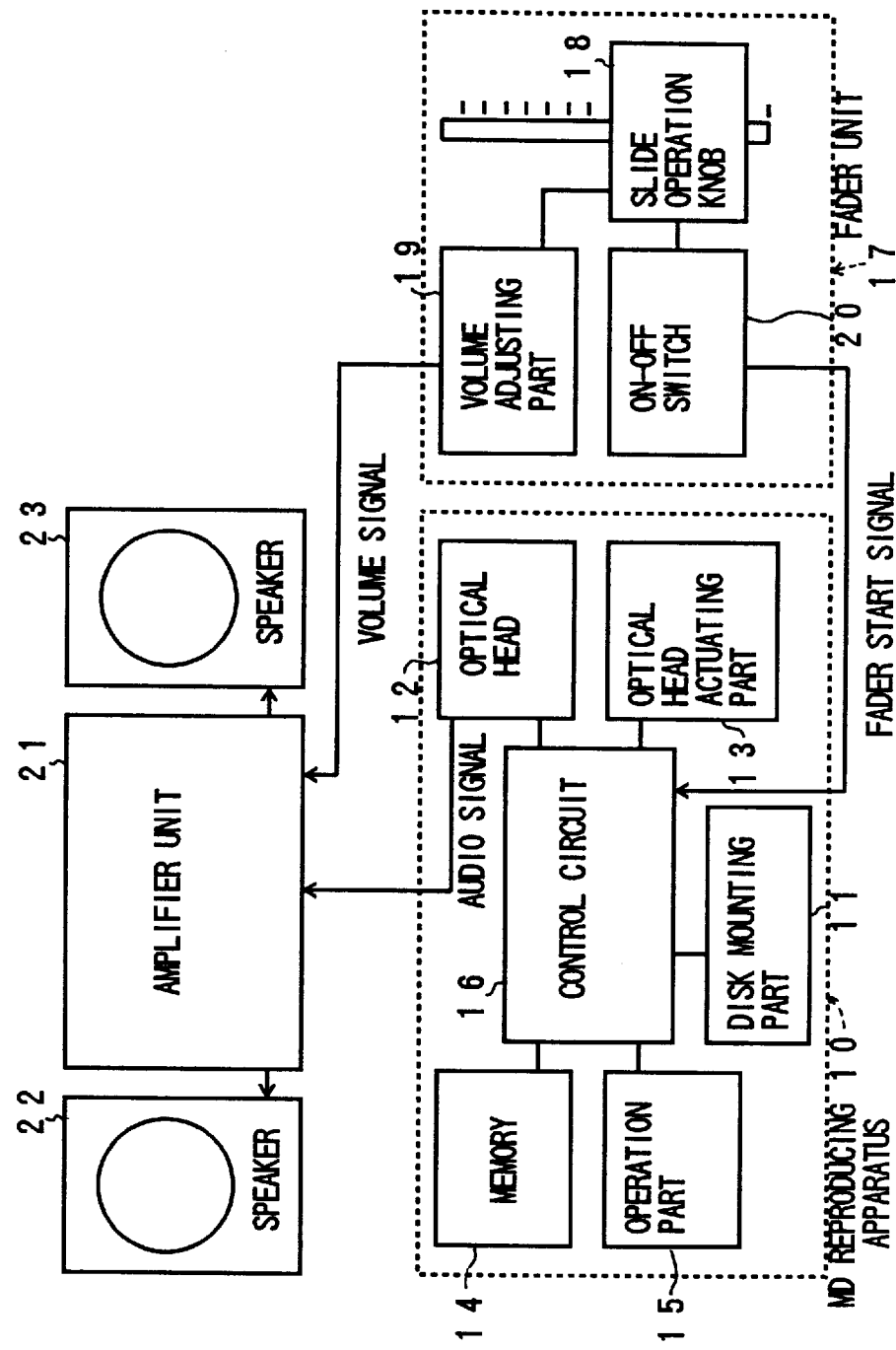
FIG. 1 is a block diagram showing an embodiment of a reproducing apparatus according to the present invention.

FIG. 1 is a block diagram showing a structure of an embodiment of a reproducing apparatus according to the present invention. The reproducing apparatus 10 shown in FIG. 1 is used for reproducing various kinds of sound effects in a theater, for example. The reproducing apparatus 10 is a MD reproducing apparatus in which what is called a "mini-disk (MD)" is mounted as a recording medium.

The reproducing apparatus 10 generally comprises a disk mounting part 11, an optical head 12, an optical head actuating part 13, a memory 14, an operation part 15 and a control circuit 16. The disk mounting part 11 is provided with a holder (not shown) in which a disk cartridge (not shown) is mounted. When the disk cartridge containing a disk is mounted in the disk mounting part 11, the disk is positioned opposite the optical head 12 so that information recorded on the disk is ready to be reproduced.

When a play mode is set, the optical head 12 optically reads out information recorded on the recording surface of the disk. Audio signals read out by the optical head 12 are delivered to the control circuit 16.

The optical head 12 moves in a radial direction (tracking direction) of the disk to be positioned opposite each of the tracks which are recorded on the disk. Signals corresponding to the sound effects are recorded on the disk at predetermined intervals. The optical head 12 reproduces the sound effects in an order which has been programmed beforehand through the operation part 15.

The memory 14 contains a program which defines the above-mentioned order of reproduction, a control program which corresponds to the respective operation modes of the apparatus, and a control program for performing an access operation to achieve a standby mode in which subsequent information is set ready to be reproduced.

The operation part 15 is provided with various operation buttons such as a power-on button, a stop button, a play button, a pause button, and a track jump button. When the pause button is depressed, a pause signal is delivered to the control circuit 16. When the track jump button is depressed, a skip signal (or an access operation signal) is delivered to the control circuit 16. Additionally, when the stop button is depressed, a stop signal is delivered to the control circuit 16.

A fader unit 17, which is constituted as a unit separate from the reproducing apparatus 10, has a function of adjusting the volume of the sound effects. Additionally, the fader unit 17 has a function of achieving the play mode or the standby mode in accordance with the operation thereof, as described below. It should be noted that a fader operation part may be provided to the operation part 15 instead of providing the fader unit 17 as a separate unit.

The fader unit 17 is provided with a slide operation knob 18. The slide operation knob 18 is connected to a volume adjusting part 19. The volume adjusting part 19 delivers a volume signal to an amplifier unit 21 in accordance with the slide operation of the slide operation knob 18. Additionally, an ON-OFF switch 20 is provided near the slide operation part 18. The ON-OFF switch 20 is disposed so that it delivers a fader start signal to the control circuit 16 when the slide operation knob 18 is in a position corresponding to a volume level of greater than "0". Hereinafter, the position of the slide operation knob 18 corresponding to a volume level of "0" is referred to as an OFF position of the slide operation knob 18. Additionally, the position of the slide operation knob 18 corresponding to a volume level of greater than "0" is referred to as an ON position of the slide operation knob 18.

The control circuit 16 is triggered by a rising or falling edge of the fader start signal to perform the access operation or achieve the play mode, as described below. Thus, in the present embodiment, it is possible to switch the operation mode of the apparatus to the standby mode while performing a fading operation by operating the slide operation knob 18. Accordingly, it is unnecessary to provide an additional access operation part and thus the operation of the apparatus can be simplified.

The audio signals amplified by the amplifier unit 21 are delivered to left and right speakers 22, 23. The speakers 22, 23 generate the sound effects corresponding to the signals read out from the disk.

Figure 2:
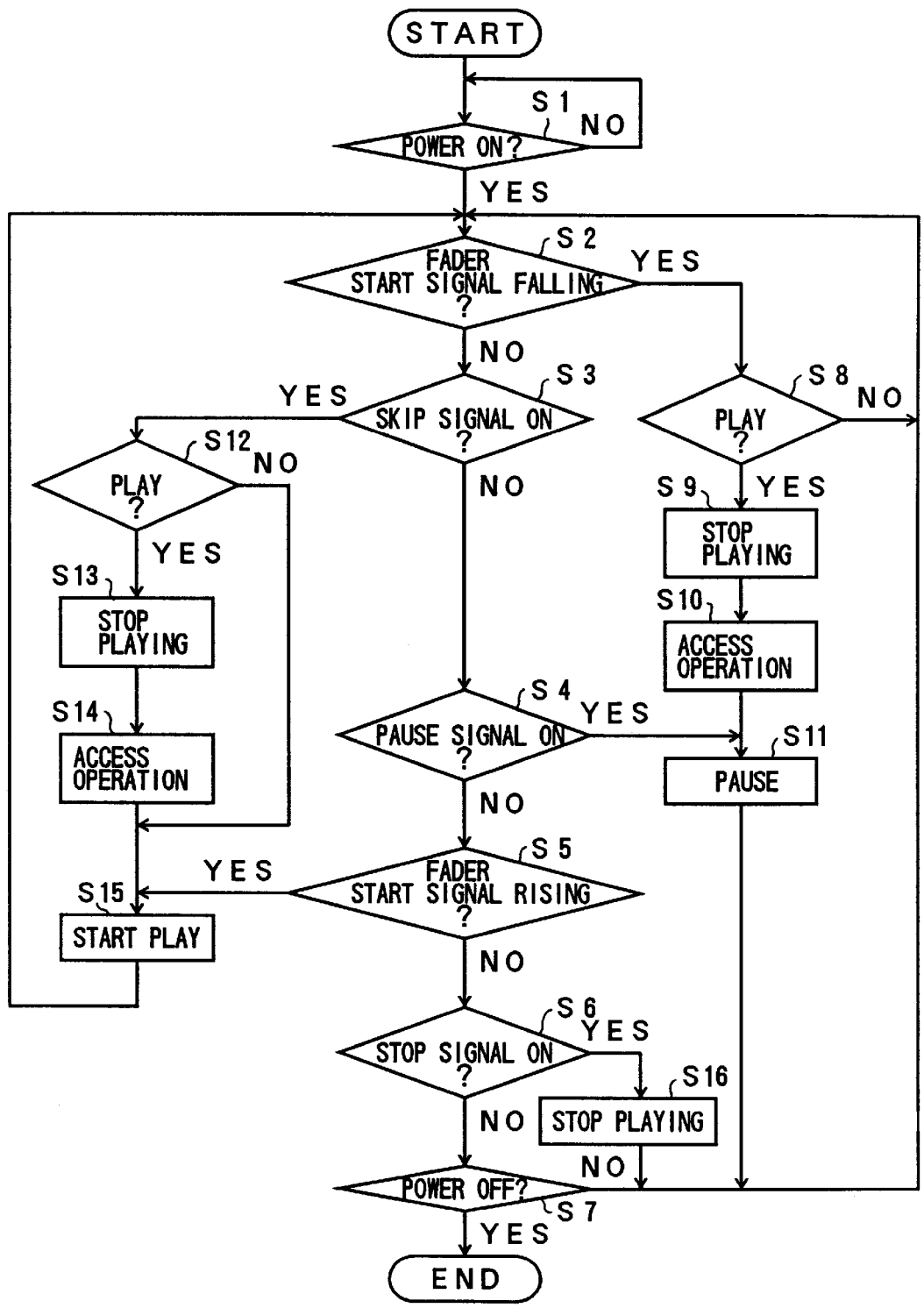
FIG. 2 is a flowchart illustrating a control operation performed by a control circuit.

Now a description will be given of a process performed by the control circuit 16 in the present embodiment. FIG. 2 is a flowchart illustrating the process performed by the control circuit 16.

In step S1 (hereinafter "step" will be omitted) shown in FIG. 2, the control circuit 16 determines whether or not the power supply is turned on. If the power supply is turned on, then the process of S2 is performed. In S2, it is determined whether or not the fader start signal is falling (that is, whether or not the fader start signal is being changed from an ON level to an OFF level). If the fader start signal is not falling in S2, then the process of S3 is performed.

In S3, it is determined whether or not the skip signal (or the access operation signal) is turned on. If the skip signal is not turned on in S3, then the process of S4 is performed. In S4, it is determined whether or not the pause signal is turned on. If the pause signal is not turned on in S4, then the process of S5 is performed.

In S5, it is determined whether or not the fader start signal is rising (that is, whether or not the fader start signal is being changed from an OFF level to an ON level). If the fader start signal is not rising in S5, then the process of S6 is performed.

In S6, it is determined whether or not the stop signal is turned on. If the stop signal is not turned on in S6, then the process of S7 is performed.

In S7, it is determined whether or not the power supply is turned off. If the power supply is turned off in S7, then the present routine is ended. On the other hand, if the power supply is not turned off in S7, the process of S2 to S7 is performed again. If any of the operation buttons of the operation part 15 and the ON-OFF switch 20 of the fader unit 17 is operated during the process of S2 to S7, the reproducing apparatus 10 is set in the corresponding operation mode.

If the fader start signal is falling (that is, if the slide operation knob 18 is slid from the ON position to the OFF position) in the above-mentioned S2, then the process of S8 is performed.

In step S8, it is determined whether or not the apparatus is set in the play mode in which the sound effects are reproduced, that is, whether or not the optical head 12 is reading information from the disk. If the apparatus is not set in the play mode in S8, then the process of S2 is performed again. On the other hand, if the apparatus is set in the play mode, then the process of S9 is performed. In S9, the sound effects stop being reproduced.

In S10, the optical head actuating part 13 is actuated so that the optical head 12 is moved to a track where a sound effect which is to be subsequently reproduced is recorded. In this way, the access operation is achieved for setting the subsequent recording part ready to be accessed for reproduction. When the access operation is completed in the above-mentioned manner in S10, the pause mode is set. When the pause mode is set, the process of S2 is performed again.

Accordingly, it is only necessary to slide the slide operating knob 18 to the OFF position in order to perform the access operation, and thus an inexperienced operator can easily perform the access operation. Additionally, a possibility of erroneous operations can be considerably reduced since it is no longer necessary to operate an additional switch for performing the access operation.

If, in the above-mentioned S3, the skip signal (or access operation signal) is turned on by the skip operation button of the operation part 15 being depressed, then the process of S12 is performed.

In S12, it is determined whether or not the apparatus is set in the play mode in which the sound effect is reproduced, that is, whether or not the optical head 12 is reading the information recorded on the disk. If the apparatus is set in the play mode in S12, the sound effect stops being reproduced in S13.

In S14, the optical head actuating part 13 is actuated so that the optical head 12 is moved to a track where the sound effect to be subsequently reproduced is recorded. Thus, the access operation is achieved in S14. When the access operation is completed, the sound effect, whose start position has been set ready to be accessed, starts being reproduced in S15, and then the process of S2 is performed again.

If the apparatus is not set in the play mode in the above-mentioned S12, then S13 and S14 are skipped and the process of S15 is performed.

If, in the above-mentioned S4, the pause signal is turned on by the pause button of the operation part 15 being depressed, then the pause mode is set in the above-mentioned S11. When the pause mode is set, then the process of S2 is performed again.

If, in the above-mentioned S5, the fader start signal is rising, that is, the slide operation knob 18 is operated from the OFF position to the ON position, then the subsequent sound effect whose start position has been set ready to be accessed starts being reproduced in S15. After the sound effect has started being reproduced, the process of S2 is performed again.

Accordingly, in the standby mode in which the access operation has been completed, the subsequent sound effect can be reproduced by only sliding the slide operation knob 18 from the OFF position to the ON position. Thus, it is possible to easily start reproducing the subsequent sound effect without performing erroneous operations. Additionally, a delay in reproducing the sound effects can be eliminated since the only operation necessary to start the reproduction is to slide the slide operation knob 18 toward the ON position.

If, in the above-mentioned S6, the pause signal is turned on by the stop button of the operation part 15 being depressed, then the optical head 12 stops reading the information and the operation mode is switched from the play mode to the stop mode, in S16. After the stop mode is set, the process of S2 is performed again.

As described above, it is possible to automatically achieve the standby mode in which the subsequent sound effect is set ready to be accessed by only sliding the slide operating knob 18 of the fader unit 17 from the ON position to the OFF position. Additionally, it is possible to immediately start to reproduce the subsequent sound effect by only sliding the slide operation knob 18 of the fader unit 17 from the OFF position to the ON position.

Thus, it is possible to avoid the troublesome operations in the conventional apparatuses including a stop operation, an access operation, a play operation and a pause operation before the subsequent sound effect is reproduced. As a result, the subsequent sound effect can be reproduced at desired timing without performing erroneous operations.

Figure 3:
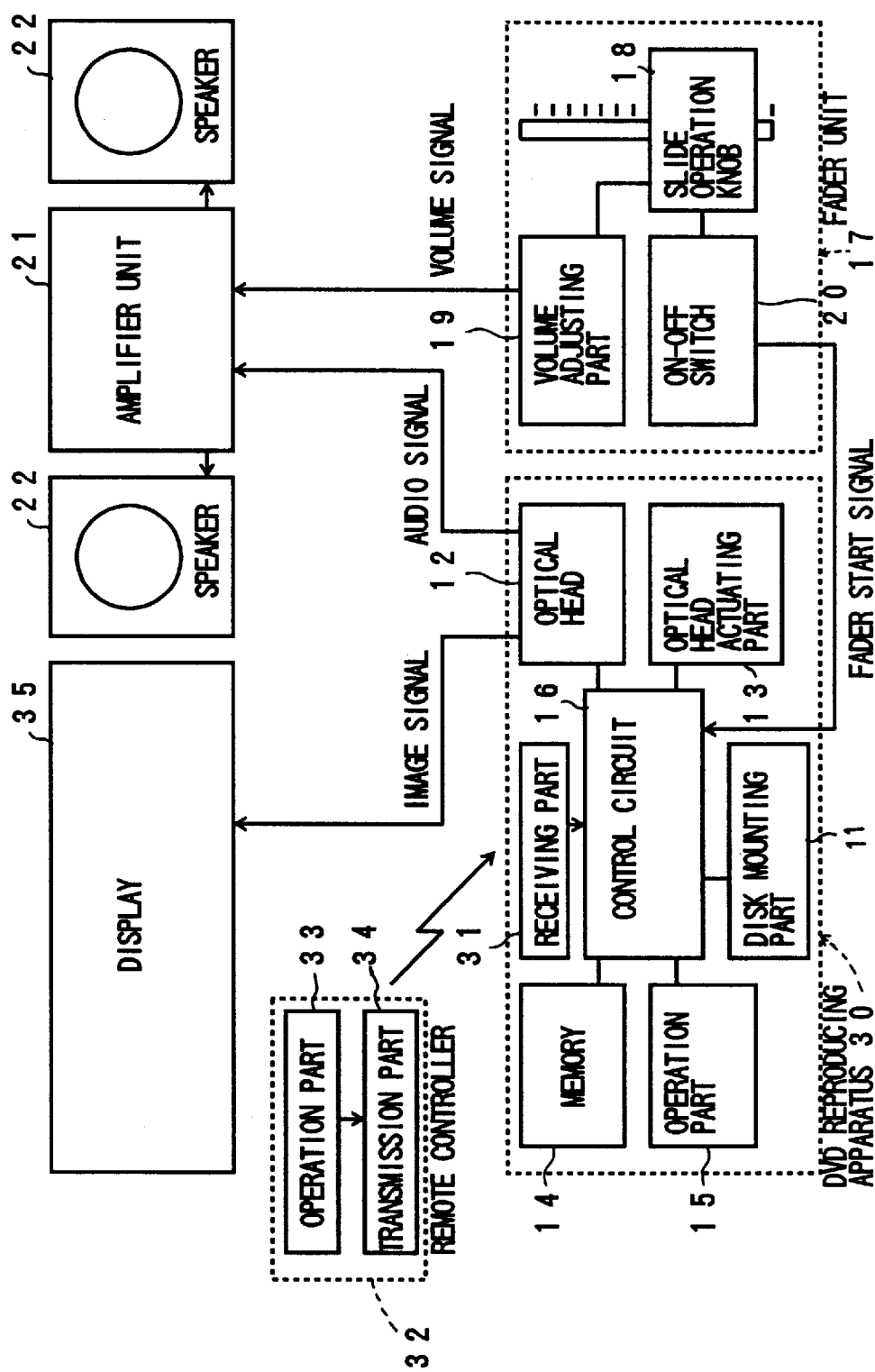
FIG. 3 is a block diagram showing a variant embodiment of the present invention.

FIG. 3 is a block diagram of a variant embodiment of the present invention. The reproducing apparatus 30 shown in FIG. 3 is used for making a presentation in a conference or an explanatory meeting. The reproducing apparatus 30 can reproduce both images and sounds. The part of the reproducing apparatus 30 for reproducing sounds has the same structure as that of the above-mentioned reproducing apparatus 10. Thus, parts of the reproducing apparatus 30 corresponding to those of the reproducing apparatus 10 are given the same reference numbers and descriptions thereof will be omitted.

The reproducing apparatus 30 is a DVD reproducing apparatus in which a DVD (digital video disk) is mounted as a recording medium. The reproducing apparatus 30 generally comprises a disk mounting part 11, an optical head 12, an optical head actuating part 13, a memory 14, an operation part 15, a control circuit 16, and a remote control receiving part 31.

The remote control receiving part 31 receives a signal which is transmitted by a transmission part 34 in accordance with an operation of an operation switch 33 of a remote controller 32. The signals received by the remote control receiving part 31 are delivered to the control circuit 16.

Information of images and sounds recorded on the DVD is read out by the optical head 12. Image signals reproduced by the optical head 12 are delivered to a display 35. On the other hand, audio signals reproduced by the optical head 12 are delivered to an amplifier unit 21. Thus, images are displayed on the display 35 and the corresponding sounds are output from speakers 22, 23.

The process shown in FIG. 2 is performed in the reproducing apparatus 30 of the present embodiment. Thus, images and sounds are simultaneously reproduced in the play mode, although detailed descriptions of the control process are omitted.

In the reproducing apparatus 30, the access operation is performed so as to achieve the standby mode in response to the falling in the fader start signal when the slide operation knob 18 is slid from the ON position to the OFF position, and the operation mode is switched from the standby mode to the play mode in response to the rising in the fader start signal when the slide operation knob 18 is slid from the OFF position to the ON position, as in the case of the reproducing apparatus 10.

Additionally, in the reproducing apparatus 30 of the present embodiment, the access operation is performed or the operation mode is switched from the standby mode to the play mode in response to the operation of the operation switch 33 of the remote controller 32.

The operation switch 33 is a push switch. When the operation switch 33 is depressed once, the control circuit 16 considers that the fader start signal is rising. Thus, the access operation is performed and the standby mode is achieved when the operation switch 33 is depressed once. When the operation switch 33 is depressed once more, the control circuit 16 considers that the fader start signal is falling. Thus, the operation mode is switched from the standby mode to the play mode when the operation switch 33 is depressed once more.

Alternatively, an operation switch for the access operation and an operation switch for starting reproduction after the access operation is performed may be separately provided.

As described above, it is possible to achieve the standby mode in which the subsequent image and sound are set ready to be accessed for reproduction and to instantaneously reproduce these images and sounds by only operating the slide operation knob 18 of the fader unit 17 or the operation switch 33 of the remote controller 32 in a case of reproducing images and sounds recorded on a DVD.

Accordingly, troublesome operations in the conventional apparatuses are no longer required and thus erroneous operations can be avoided. Additionally, an inexperienced operator can start to reproduce the images and sounds without missing adequate timing for reproduction since the subsequent image and sound have been set ready to be accessed.

It should be noted that, in the process of the above-mentioned S11 shown in FIG. 2 where the pause mode is set in the play mode, the pause mode may be set after a predetermined amount of information recorded on the recording medium is read out (but not reproduced) and stored in the memory 14. In this case, when the subsequent reproduction is started, the information stored in the memory 14 is reproduced first and then the information recorded on the medium is reproduced. Thus, it is possible to quickly start to reproduce the subsequent information.

In the above-mentioned embodiments, descriptions are given with reference to reproducing apparatuses using the mini-disk (MD) or the digital video disk (DVD) as a recording medium. However, the application of the present invention is not limited to the MD or the DVD, but the present invention can also be applied to any type of recording medium such as an audio cassette tape, a VTR cassette tape, an 8-mm VTR cassette tape, a digital VTR cassette tape, an open-reel type cassette tape, a magnetic disk or an optical disk.

Additionally, in the above embodiments, the slide operation knob 18 is used to perform the access operation and to switch the operation mode from the standby mode to the play mode. However, a variable resistor having, instead of the slide operation knob 18, a rotary operation knob or a lever-type operation knob may be used.

Further, the present invention is not limited to these embodiments, but variations and modifications may be made without departing from the scope of the present invention.

The present application is based on Japanese priority application No.9-161010 filed on Jun. 18, 1998, the entire contents of which are hereby incorporated by reference.

What is claimed is:

1. A reproducing apparatus comprising:

a reader for reading out information from a recording medium on which a plurality of pieces of information are recorded;

an actuator for changing a relative position of said reader and the recording medium;

a signal generator for generating a first signal corresponding to a predetermined operation; and an access operation controller for switching the operation mode of the apparatus from a play mode to a stop mode in response to the first signal generated by said signal generator when the reader is reading out information, and thereafter the access operation controller controlling said actuator to change the relative position of the reader and the recording medium and switching the operation mode of the apparatus to a standby mode in which the subsequent information is set ready to be read out.

2. A reproducing apparatus comprising:

a reader for reading out information from a recording medium on which a plurality of pieces of information are recorded;

an actuator for changing a relative position of said reader and the recording medium;

a signal generator for generating first and second signals corresponding to predetermined operations; and an access operation controller for controlling said actuator to change the relative position of the reader and the recording medium and for switching the operation mode of the apparatus to a standby mode in which subsequent information is set ready to be read out after the operation mode of the apparatus has been switched from a play mode to a stop mode in response to the first signal generated by said signal generator; and a reproduction controller for switching the operation mode of the apparatus from the stop mode to the play mode in response to the second signal generated by said signal generator.

3. The reproducing apparatus as claimed in claim 1, wherein said signal generator generates the first signal in response to an operation of a fader.

4. The reproducing apparatus as claimed in claim 2, wherein said signal generator generates the first and second signals in response to volume-decreasing and volume-increasing operations of a fader.

5. A reproducing apparatus comprising:

a reader for reading out information from a recording medium on which a plurality of pieces of information are recorded;

an actuator for changing a relative position of said reader and the recording medium;

a signal generator for generating first and second signals corresponding to predetermined operations;

an access operation controller for switching the operation mode of the apparatus from a play mode to a stop mode in response to the first signal generated by said signal generator when the reader is reading out information, and thereafter the access operation controller controlling said actuator to change the relative position of the reader and the recording medium and switching the operation mode of the apparatus to a standby mode in which subsequent information is set ready to be read out; and a reproduction controller for switching, when the second signal is generated by the signal generator during the standby mode of the apparatus, the operation mode of the apparatus from the standby mode to the play mode in response to the second signal, so that the reader starts reading out the subsequent information.

6. The reproducing apparatus according to claim 5, wherein the access operation controller switches the operation mode of the apparatus from the play mode to the stop mode in response to the first signal that is generated by the signal generator when the reader is reading out information, and the reproduction controller switches the operation mode of the apparatus from the standby mode to the play mode in response to the second signal that is generated by the signal generator during the standby mode of the apparatus.

7. The reproducing apparatus according to claim 6, wherein the signal generator generates the first and second signals in response to predetermined operations of a fader unit.

8. The reproducing apparatus according to claim 7, wherein the signal generator generates the first signal in response to a volume-decreasing operation of a fader unit, and generates the second signal in response to a volume-increasing operation of the fader unit.

* * * * *